Nov. 13, 1928.  
H. PERROT  
1,691,584  
VEHICLE BRAKE MECHANISM  
Filed Oct. 7, 1924  
3 Sheets-Sheet 1

INVENTOR  
HENRI PERROT  
BY  
A. D. T. Libby  
ATTORNEY

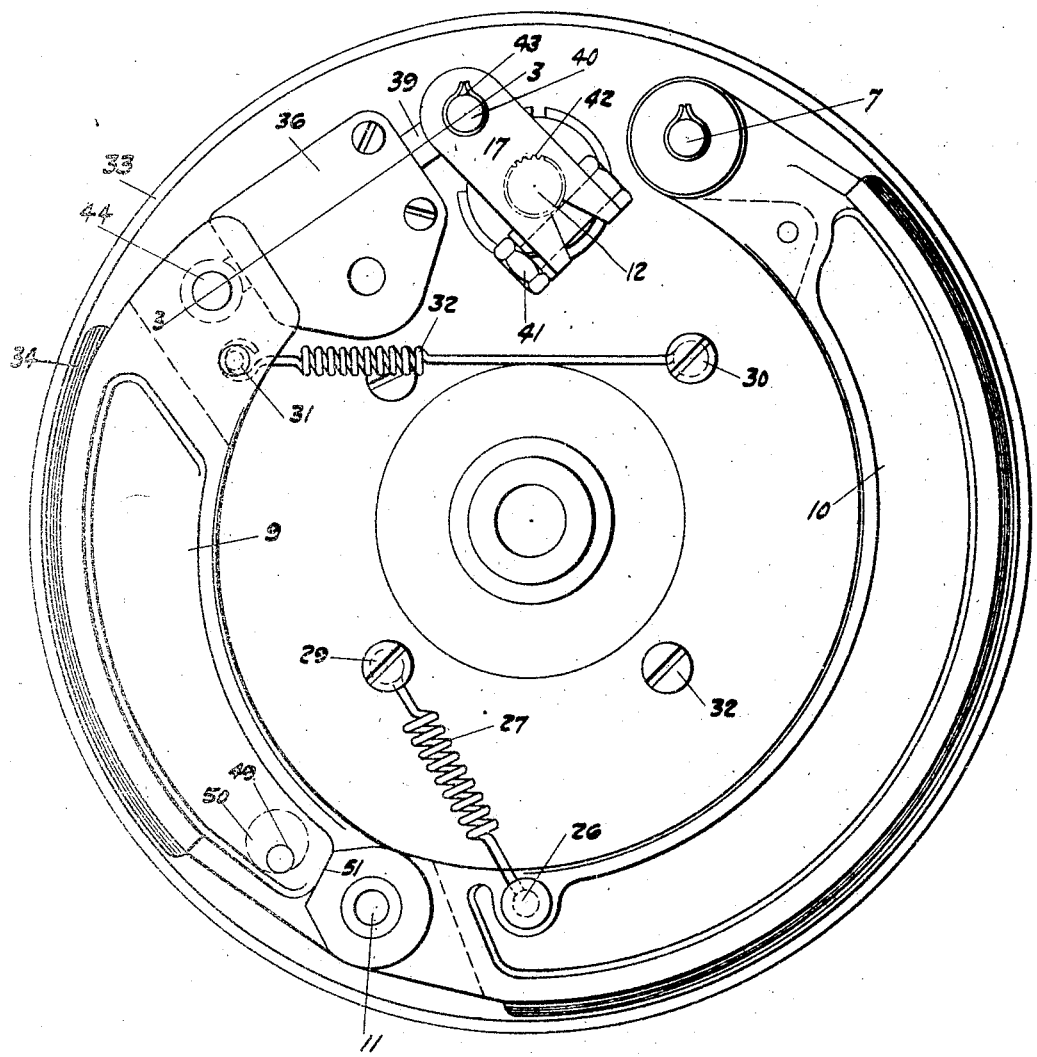

Nov. 13, 1928.
H. PERROT
1,691,584
VEHICLE BRAKE MECHANISM
Filed Oct. 7, 1924    3 Sheets-Sheet 3
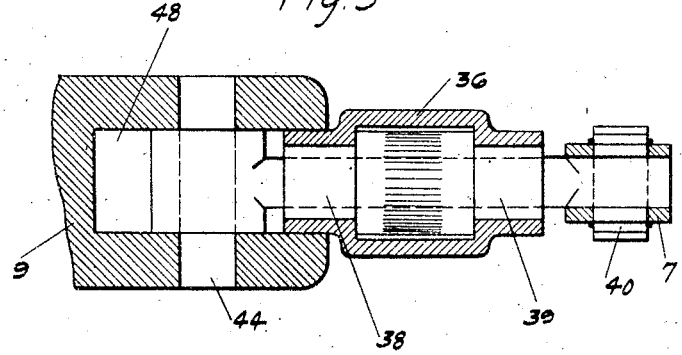
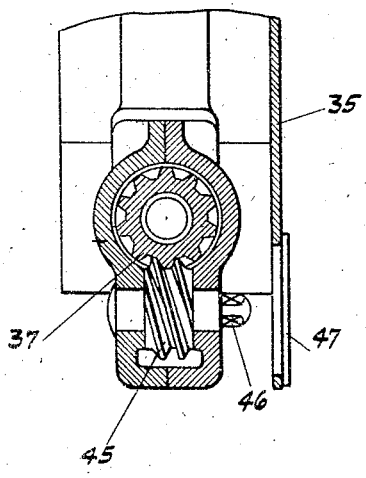
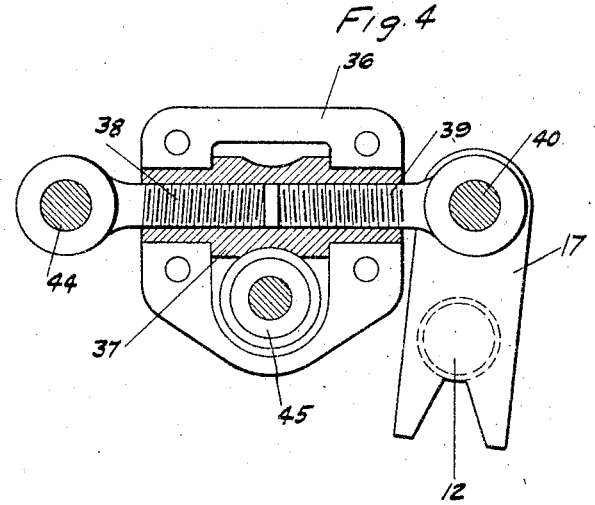
INVENTOR
*HENRI PERROT*
BY
ATTORNEY Patented Nov. 13, 1928.

1,691,584

UNITED STATES PATENT OFFICE.

HENRI PERROT, OF PARIS, FRANCE, ASSIGNOR TO BENDIX CORPORATION, OF CHICAGO, ILLINOIS, A CORPORATION OF ILLINOIS.

VEHICLE BRAKE MECHANISM.

Application filed October 7, 1924, Serial No. 742,156, and in France May 23, 1924.

This invention relates to the design of vehicle wheel brakes and is especially adapted for use in connection with front wheels.

As shown in the drawings forming a part of this specification, the brakes are of the internal type, which for a number of reasons are preferred by many designers and users, but the mounting of such brakes and the method of actuating the same involves a great deal of study. In the application of internal brakes it has been the standard practice in the past to anchor the brake shoes at one end and to act between the opposite ends with some sort of a cam device, which serves to spread the brake shoes apart into contact with the wheel drum. In my present invention, I provide a positive connection or linkage between the operating member and at least one of the brake shoes and in order to best illustrate the application of my invention, I have chosen to show the details relating thereto as applied to a self-energizing or servo brake comprising a plurality of articulated shoes, one end of the shoe combination being relatively fixed, while the free end of the combination is connected through the positive linkage to the operating member.

It is, therefore, one of the objects of my invention to provide such a positive linkage as has been referred to.

Another object of my invention is to provide an easy and direct adjustment of the brake shoes, which adjusting means is readily accessible from the exterior of the drum.

Another object of my invention is to provide a releasing means for the brake shoes so positioned as to prevent the rattling of the shoes in their normal or retracted position.

These and other objects will be clearly understood after a study of the specification taken in connection with the drawings, wherein:

Figure 2 is an elevation of the brakes within the drum.

Figure 3 is a sectional view on the line 3/3 of Fig. 2; while

Figures 4 and 5 are different detail views, partly in section, of the adjusting device.

Figure 1:
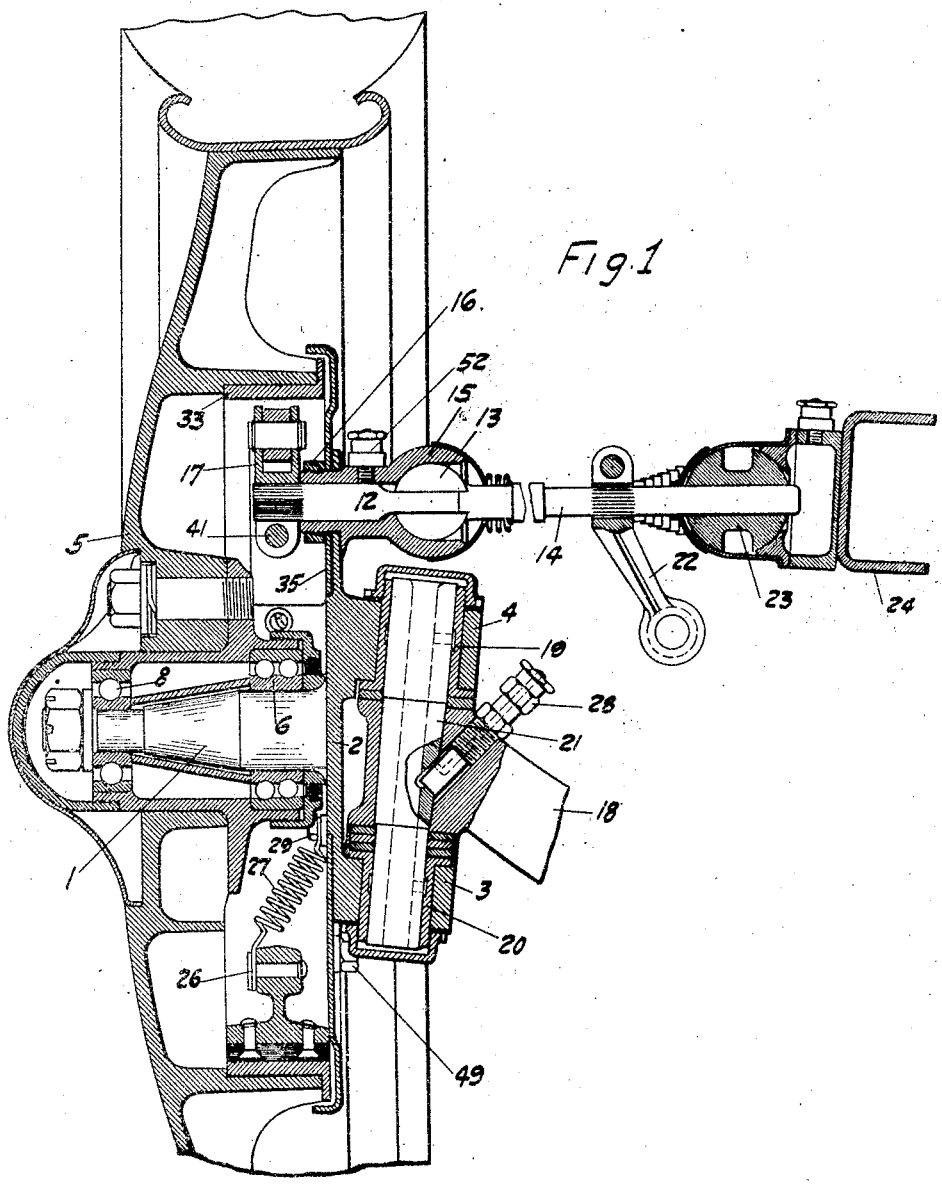
Figure 1 is a part sectional view through a front wheel showing the wheel support and the brake control mechanism.

In the drawings, 1 is a wheel spindle having an integral plate 2 with bosses 3 and 4 thereon. Between the bosses 3 and 4 is positioned the end of an axle 18 through which the pivot or king pin 21 passes. The ends of the king pin being supported in bushings 19 and 20, carried in the bosses 4 and 3 respectively. The king pin is held in position in the end of the axle by the threaded lubricant member 28. The details of this construction are more fully described and claimed in my copending application, Serial No. 742,157, filed Oct. 7, 1924.

The spindle 1 carries a wheel generally referred to as 5 and is supported on the spindle 1 by the bearings 6 and 8. The plate 2 extends upward from the spindle and on this upward projection the anchor pin 7, for the secondary brake shoe 10, is mounted. The primary brake shoe 9 is articulated to the shoe 10 by a joint 11, there being no connection between the joint 11 and any other part of the brake mechanism. The shoes 9 and 10 carry any suitable brake material 34, which is adapted to engage the drum 33. The free end of the primary brake shoe 9 is slotted or has a part with a slot 48 therein. Positioned in this slot is a box-like container 36, within which is housed the principal part of the brake adjusting mechanism, which comprises two gear wheels 37 and 45, the shaft for gear 45 having an operating means 46 connected thereto, whereby the gear 45 and consequently the gear 37 may be turned by removing the cap 47 from the drum cover plate 35. Threaded into the gear 37 are two members 38 and 39. The member 38 is connected by a pin 44 to the brake shoe 9, while the member 39 is connected by a pin 40 to a member 17 carried on the end of the operating shaft 12. The adjusting mechanism just described is substantially dust, water and oil tight, so that it will carry a sufficient quantity of lubricant for a long time.

The end of the shaft 12 is preferably fluted at 42 in order to get a good grip on the member 17, its position being fixed by a clamping bolt 41. The pin 40 is preferably held in position by snap rings 43 lying in grooves in the end of the pin on either side of member 17. The operating member 12 is connected through a universal joint illustrated by 13, to which is connected a control rod 14 and a control lever 22. The chassis end of the control rod 14 is supported to the side member 24 of the chassis by any satisfactory means, such as a ball slip joint 23. The operating shaft 12 is carried in a support 15 held to the plate 2 by nut 16. An oiling device 52 may be used to lubricate the joint and bearing for the member 12. The brake shoe 9 has a return spring 32 anchored to it at 31, the other end of the spring being anchored to a plate 35 as indicated at 30. The secondary shoe 10 has a spring 27 attached to it at 26, while the other end of the spring is anchored either to the cover plate or the spindle plate as at 29. One of the springs, preferably 27, is set obliquely to the plane of the brake shoes as clearly indicated in Fig. 1 for the purpose of preventing rattle of the shoes against the cover plate.

The adjustment of the secondary shoe 10 with respect to the drum 33 is controlled by means of a cam 50 actuated by a control rod 49, which is adjustable from the exterior of the drum, as will be seen from Fig. 1. As illustrated in the drawing, the cam 50 is adapted to engage the surface 51 on the heel of the brake shoe 10. The actual point of engagement of the cam 50 may be varied considerably, even to the point of engaging directly on the pivot itself, but in any event, I prefer to place this eccentric adjustment near the articulated joint between the brake shoes.

From what has been said it will be seen that the setting of brake shoe 9 may be very readily attained through the turnbuckle arrangement which has been described and which is adapted to be adjusted from the exterior of the drum. This system of adjustment is very important in front wheel brakes, when operated through some sort of a universal joint as illustrated, whether or not this joint is placed in the axis of the pivot pin; for this arrangement alone makes it possible to maintain the position of the axes of the universal joint constant with relation to the horizontal plane of the axle; it being understood that the original setting has been one to give the desired results. The adjustment is made with the brakes in the "off" position and since the distance between the nose of shoe 9 and the pin 40 increases as the brake lining wears an adjustment as described repositions the brake shoe without disturbing the operating member and the parts of the universal joint when such is used.

It will be apparent that numerous changes may be made in the details of my invention without departing from the spirit of the same and the scope of the appended claims, for example while I have shown the operating member in connection with a universal joint and other associated parts, it will be apparent that the member may be actuated by means different from that illustrated.

Having thus described my invention, what I claim is:

1. In a brake mechanism, a drum, an internal brake for engaging said drum having one end relatively fixed, an operating member, and a positive linkage between said operating member and the other end of said brake including a lengthwise-extensible connection.

2. In a brake mechanism, a drum, an internal brake for engaging said drum having one end relatively fixed, an operating member, and a positive adjustable linkage between said operating member and the other end of said brake.

3. In a brake mechanism, a drum, an internal brake for engaging said drum, having one end relatively fixed, an operating member, and a positive adjustable linkage between said operating member and the other end of said brake, said linkage including a turnbuckle device adjustable from the exterior of the drum.

4. In a brake mechanism, a drum, an internal brake for engaging said drum, having one end relatively fixed, an operating member, and a positive adjustable linkage between said operating member and the other end of said brake, said linkage including a turnbuckle device, comprising a worm adjustable from the exterior of the drum, and a gear wheel internally threaded with a connector extending from each end thereof, one connector being attached to the end of the brake shoe and the other adapted to be connected to said operating member.

5. In a brake mechanism, a drum, an internal brake for engaging said drum having one end relatively fixed, an operating member, a container movable bodily with the brake and carrying adjusting devices connecting between said operating member and the other end of said brake.

6. In a brake mechanism, a drum, an internal brake for engaging said drum having one end relatively fixed, an operating member, a container positioned at one end of said brake and bodily movable with the brake, said container carrying adjusting devices connected between said operating member and said other end of the brake.

7. In a brake mechanism, a drum, an internal brake for engaging said drum having one end relatively fixed, an operating member, a box like container slidably positioned at one end of said brake, said container carrying adjusting devices connected between said operating member and said other end of the brake.

8. In a brake mechanism, a drum, an internal brake for engaging said drum having one end relatively fixed, an operating member, a box like container positioned in one end of said brake, said container carrying an internally threaded gear and a worm wheel in mesh with said gear, threaded members connected to said gear and extending without the container, one of said members being connected to said brake end, a member connected to said operating member and to the other of said threaded members and means for turning said worm and gear for the purpose described.

9. In a brake mechanism, a drum, a brake for engaging said drum, an operating member and a worm and gear turnbuckle adjusting mechanism connected between the brake and operating member and bodily movable in applying the brake.

10. In a brake mechanism, a drum, a brake for engaging said drum, an operating member, a box like container positioned on one end of said brake and bodily movable in applying the brake, said container carrying a worm and gear included as a part of a turnbuckle connector adjusting mechanism connected between said operating member and said brake.

11. In a brake mechanism, a drum, a self energizing brake therefore, comprising at least two articulated shoes, the end of one being relatively fixed, an operating shaft and a positive linkage between said shaft and the end of one of said shoes, and a spring arranged to insure engagement with the drum of the shoe linked to the shaft prior to the shoe having the fixed end.

12. In a brake mechanism, a drum, a self energizing brake therefor, comprising at least two articulated shoes, the end of one being relatively fixed, and operating shaft and a positive linkage connected between said shaft and the end of one brake shoe, said linkage being readily adjustable from the exterior of said drum.

13. In a brake mechanism, a drum, an internal brake for engaging said drum having one end relatively fixed, an operating member including a universal joint and means interposed between said operating member and the other end of said brake for adjusting and maintaining the position of the axes of said universal joint.

14. In a brake mechanism, a drum, a self energizing brake therefor, comprising at least two articulated shoes, the end of one being relatively fixed, an operating member for moving the free end of one of said shoes and an eccentric adjusting device adjacent one of the articulated ends of the shoes for acting on the other of said shoes for adjusting its position with respect to the drum.

15. In a brake mechanism, a drum, a self energizing brake therefor, comprising at least two articulated shoes, the end of one being relatively fixed, an operating member for moving the free end of one of said shoes and an eccentric adjusting device adjacent one of the articulated ends of the shoes for acting on the toe of the relatively fixed shoe for adjusting its position with respect to the drum.

16. In a brake mechanism, a drum, a self energizing brake therefor, comprising at least two articulated shoes, the end of one being relatively fixed, an operating member for moving the free end of one of said shoes and an eccentric adjusting device adjacent one of the articulated ends of the shoes for acting near the articulated joint for adjusting the position of the joint and shoes with respect to the drum.

17. In a brake mechanism, a drum, a self energizing brake therefor, comprising a plurality of articulated shoes, means for moving said shoes into engagement with the drum and an eccentric adjusting device adjacent one of the articulated ends of the shoes for acting on some part of said shoes.

18. In a brake mechanism, a drum, a self energizing brake therefor comprising articulated primary and secondary shoes, means for moving said shoes into engagement with the drum, a release spring for the primary shoe, a release spring for the secondary shoe, said last mentioned spring being set obliquely with reference to the plane of the brake shoes to prevent rattling of the brake shoes.

19. In a brake mechanism, a drum, a self energizing brake therefor comprising articulated primary and secondary shoes, means for moving said shoes into engagement with the drum, a release spring for the primary shoe, a release spring for the secondary shoe, at least one of said springs being set at an angle with the plane of the brake shoes to prevent rattling of said shoes.

20. In a brake mechanism, a drum, brake shoes within the drum, means for causing said shoes to engage the drum, release springs for said shoes, at least one of said springs being set obliquely to the plane of the shoes to prevent rattling thereof.

21. In a brake mechanism, a drum, a self energizing brake therefor comprising a plurality of shoes connected by a floating articulated joint, means for moving said shoes into engagement with the drum and an adjusting device for acting on some part of said shoes, near the articulated joint for adjusting the shoe or shoes with respect to the drum.

22. A wheel support, comprising an integral spindle and plate, said plate having bosses to make attachment of the support to an axle, said plate extending upward from the spindle and having a plurality of orifices therein, one to receive the brake-operating mechanism and another the brake anchorage, in combination with a member supporting the shaft of said mechanism and extending through its orifice and having a shoulder on one side of the plate, and a nut threaded on the member and cooperating with the shoulder to clamp the member in the orifice.

23. Brake-applying means including an operating shaft and a plate having an opening through which the shaft passes, in combination with a member having a bearing for the shaft and shouldered on one side of said plate, and a nut on the other side of the plate and threaded on the member to clamp it to the plate.

24. Brake-applying means including an operating shaft and a plate having an opening through which the shaft passes, in combination with a member having a bearing for the shaft and shouldered on one side of said plate, and a part on the other side of the plate and operating with the shouldered part of said member to clamp said member to the plate.

In testimony whereof, I affix my signature.

HENRI PERROT.